United States Patent [19]

Morozumi et al.

[11] 4,070,606
[45] Jan. 24, 1978

[54] DRIVING CIRCUIT FOR BRUSHLESS DC MOTOR

[75] Inventors: Hiroshi Morozumi; Hiroyasu Kanemaru, both of Tokyo, Japan

[73] Assignee: Hitachi, Ltd., Japan

[21] Appl. No.: 713,915

[22] Filed: Aug. 12, 1976

[30] Foreign Application Priority Data

Aug. 20, 1975 Japan .................................. 50-100205

[51] Int. Cl.$^2$ ............................................. H02K 29/02
[52] U.S. Cl. ....................................... 318/254; 318/138
[58] Field of Search ............... 318/254, 138, 249, 696, 318/685

[56] References Cited

U.S. PATENT DOCUMENTS

| | | | |
|---|---|---|---|
| 3,896,357 | 7/1975 | Tanikoshi | 318/254 |
| 3,940,670 | 2/1976 | Tanikoshi | 318/254 |

Primary Examiner—Herman J. Hohauser
Attorney, Agent, or Firm—Craig & Antonelli

[57] ABSTRACT

A driving circuit for a brushless DC motor provided with an element for detecting the angular position of the rotor of the motor, characterized in that by the output of the differential amplifier for amplifying the output of the detecting element, a switching element is rendered on and off during a certain portion of the duration of the output of the detecting element and that the motor is rotated at a constant speed by applying a rotation control voltage to an element for energizing the stator winding of the motor during the non-conductive period.

13 Claims, 7 Drawing Figures

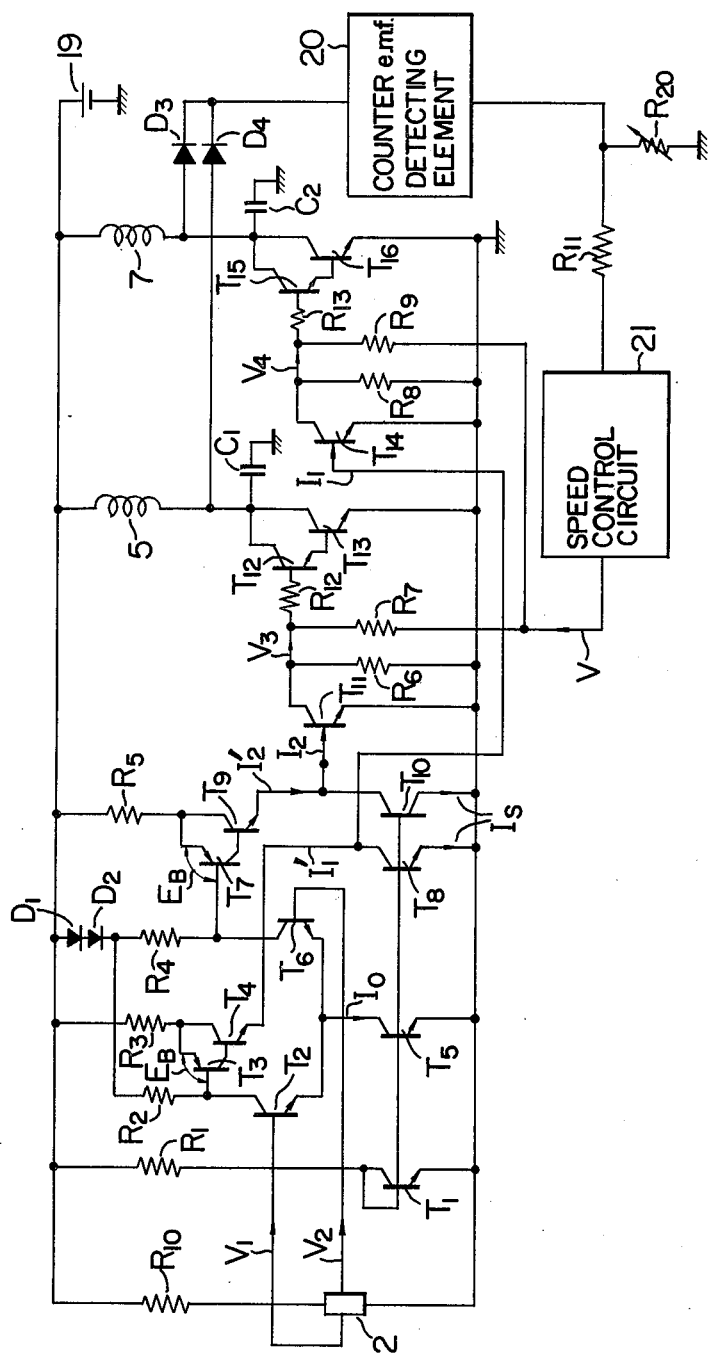
F I G. 2

DRIVING CIRCUIT FOR BRUSHLESS DC MOTOR

BACKGROUND OF THE INVENTION

1. FIELD OF THE INVENTION

This invention relates to a driving circuit for brushless DC motor furnished with an angular position detecting element.

2. DESCRIPTION OF THE PRIOR ART

Hitherto, there is known a driving circuit for a motor, in which the angular positions of the rotor of the motor are detected by means of a contactless detector so as to control the currents through the corresponding coils of the armature winding in response to the output of the detector.

With the conventional driving circuit of this kind, the corresponding coils of the stator winding are energized with the signal obtained by converting the output of the angular position detecting elements provided along the stator into a signal having a constant pulse width suitable for motor-driving by the use of a pulse-forming circuit including a level shifting circuit comprising zener diodes.

However, such a conventional driving circuit requires many circuit elements such as zener diodes and resistors so that the overall circuit becomes complicated and also consumes a considerable power. This gives rise to a drawback that the integration of the driving circuit is very difficult. Further, the conventional driving circuit is liable to be affected by the fluctuation of the ambient temperature so that it cannot be free from a drawback that the rotational speed adversely fluctuates.

SUMMARY OF THE INVENTION

The main object of this invention is to provide a driving circuit for a brushless DC motor, which consumes a small power, is simple in circuit configuration and can easily be integrated.

Another object of this invention is to provide a driving circuit for a brushless DC motor, which can stably operate in spite of the change in the ambient temperature, with a high reliability.

According to the feature of this invention, which has been made to attain these objects, the AC signal voltage delivered from the angular position detecting element is amplified through a differential amplifier and then converted to an AC signal current; the current as the difference between the AC signal current and the current supplied from a constant current source, is taken out to determine a desired conduction angle in accordance with the product of the difference current and the speed control signal; and the motor is rotated at a constant speed by energizing the coils of the stator winding in accordance with the desired conduction angle.

BRIEF DESCRIPTION OF THE DRAWINGS

FIG. 2 a driving circuit as an embodiment of this invention.

DETAILED DESCRIPTION OF THE INVENTION

Figure 1:
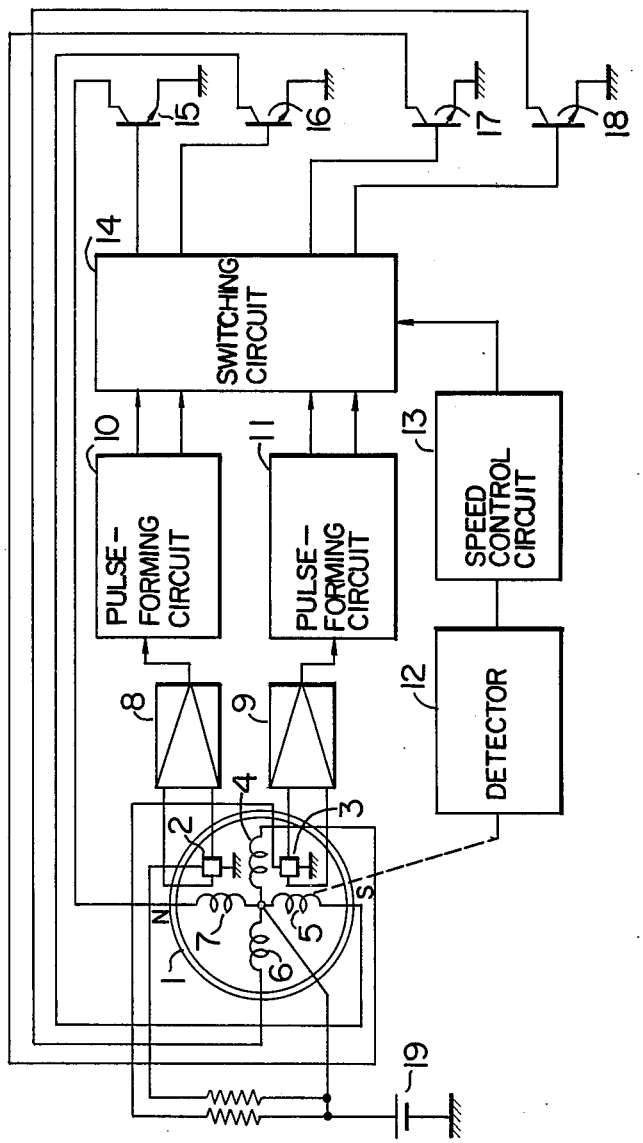
FIG. 1 is a block diagram of a conventional driving circuit.

In FIG. 1 showing a conventional driving circuit for a brushless DC motor, reference numeral 1 indicates a rotor of permanent magnet having a pair of N and S poles; 2 and 3 Hall elements for detecting the angular positions of rotation of the rotor 1; 4 to 7 coils constituting a rotor winding; 8 and 9 differential amplifiers; 10 and 11 pulse-forming circuits each including, for example, a level shift circuit; 12 a detecting circuit for obtaining a voltage whose amplitude is proportional to the rotational speed of the motor; 13 a speed control circuit; 14 a switching circuit; 15 to 18 transistors for driving the coils of the stator winding; and 19 a DC power source.

The brushless DC motor mainly comprises a rotor 1, coils 4 to 7 of the stator winding and Hall elements 2 and 3 provided in the vicinity thereof.

As seen in FIG. 1, the Hall elements 2 and 3 are so connected as to drive the corresponding coils 4 to 7 of the stator. Namely, the signals induced in the Hall elements 2 and 3 by the rotating magnetic field are amplified by the differential amplifiers 8 and 9 and further converted to pulse signals having constant pulse widths suitable for motor driving by the pulse-forming circuits 10 and 11. Simultaneously, a voltage having an amplitude proportional to rotational speed is taken out from the terminals of the stator winding by means of the detecting circuit 12 and the voltage, i.e. the output of the detecting circuit 12, is applied through the speed control circuit 13, to the switching circuit 14 which is turned on and off by the pulse signals.

The outputs of the switching circuit 14 are applied to the bases of the transistors 15 – 18 for driving the corresponding coils of the stator so that the motor is rotated at a constant speed by controlling the currents flowing through the transistors.

A level shift circuit consisting of zener diodes etc. is used in the pulse-forming circuit having a function of determining a conduction angle. The conduction angle mentioned here refers to the duration of the current flowing through the stator winding, expressed in terms of angle.

The conventional circuit described above is complicated, especially in its driving circuit, and encounters problems on the simplification of circuit and the reduction of consumed power. Further, the conventional circuit has a drawback that the rotational characteristic is degraded due to the variation of the conduction angle, caused by the fluctuation of temperature in the detecting element.

FIG. 2 shows a driving circuit as an embodiment of this invention, in which a reference numeral 2 indicates a silicon Hall element serving as an angular position detecting element; 5 and 7 the coils of a stator winding; 19 a DC power source; 20 a counter electromoting force detecting circuit; 21 a speed control circuit; reference characters $T_1 - T_{16}$ designate transistors; $D_1 - D_4$ diodes; $R_1 - R_{13}$ fixed resistors; $C_1$ and $C_2$ capacitors; and $R_{20}$ a variable resistor.

In FIG. 2, for simplicity's sake, is shown a driving circuit for a two-phase, two-pole, brushless motor. For a multi-phase, multi-pole motor, circuits each including Hall element have only to be incorporated according to the structure of the motor.

The output terminals of the Hall element 2, which generates AC voltages $V_1$ and $V_2$ by the magnetic field of the rotor of the motor, are connected with with the bases of the transistors $T_2$ and $T_6$ constituting a differential amplifier. Transistors $T_1$, $T_5$, $T_7$ and $T_{10}$ constitute a constant current circuit for supplying a desired constant current. One ends of the load resistors $R_2$ and $R_4$ are connected with the collectors of the transistors $T_2$ and $T_6$ while the other ends of the resistors $R_2$ and $R_4$ are connected in common with the power source 19 through the diodes $D_1$ and $D_2$ for compensating the variation of the conduction angle due to the thermal fluctuation of the angular position detecting signal. The collector of the transistor $T_1$ is connected with the power source 19 via the resistor $R_1$ and the collector of the transistor $T_5$ is connected with both the emitters of the transistors $T_2$ and $T_6$.

A set of transistors $T_3$ and $T_4$ for current level shifting are coupled to the collector of the transistor $T_2$ while a set of transistors $T_7$ and $T_9$ for current level shifting are coupled to the collector of the transistor $T_6$, and the emitters of the transistors $T_4$ and $T_9$ are connected respectively with the collectors of the transistors $T_8$ and $T_{10}$ so as to take out the above-mentioned difference current for determining the conduction angle. The set of transistors $T_3$ and $T_4$ and the set of the transistors $T_7$ and $T_9$ are each in the Darlington configuration.

The emitters of the transistors $T_4$ and $T_9$ are connected respectively with the transistors $T_{11}$ and $T_{14}$ serving as switching elements. One ends of the coils 5 and 7 of the stator winding are connected with the power source 19 and the other ends of the coils are connected with the counter e.m.f. detecting circuit 20 via the diodes $D_3$ and $D_4$. The output of the detecting circuit 20 is connected with the speed control circuit 21 via the resistors $R_{11}$ and $R_{20}$. The output of the speed control circuit 21 is connected with the collectors of the transistors $T_{11}$ and $T_{14}$ via the resistors $R_7$ and $R_9$, respectively. The collectors of the transistors $T_{11}$ and $T_{14}$ are grounded through the resistors $R_6$ and $R_8$ and also connected with the bases of the transistors $T_{12}$ and $T_{15}$ via the resistors $R_{12}$ and $R_{13}$. The collectors and the emitters of the transistors $T_{12}$ and $T_{15}$ are connected respectively with the collectors and the bases of the transistors $T_{13}$ and $T_{16}$ for driving the coils 5 and 7 of the stator winding. The collectors of the transistors $T_{13}$ and $T_{16}$ are connected respectively with the other ends of the coils 5 and 7 of the stator winding and also grounded through the capacitors $C_1$ and $C_2$. The emitters of the transistors $T_1$, $T_5$, $T_8$, $T_{10}$, $T_{11}$, $T_{13}$, $T_{14}$ and $T_{16}$ are grounded and the collectors of the transistors $T_4$ and $T_9$ are connected with the power source 19 respectively via the resistors $R_3$ and $R_5$ and the voltage of the DC power source 19 is applied to the Hall element 2 through the resistor $R_{10}$.

Figures 3, 4, 5, 6:
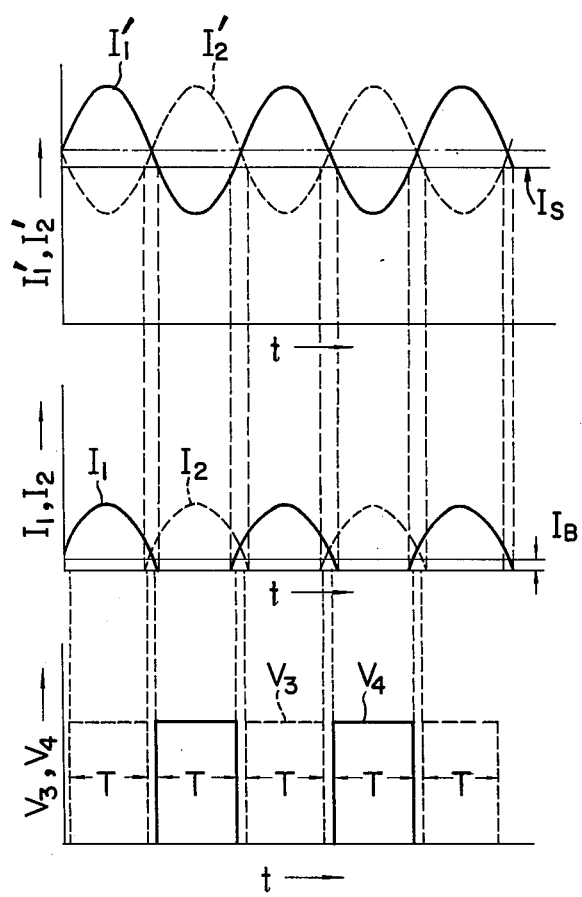
FIGS. 3 to 6 show the waveforms of signals appearing at several points in the circuit shown in FIG. 2, useful for explaining the operation of the circuit.

Now, the operation of the circuit shown in FIG. 2 will be described with the aid of FIG. 4 showing the waveforms appearing at several points in the circuit in FIG. 2.

When the motor is rotating, the voltages $V_1$ and $V_2$ having sinusoidal waveforms as shown in FIG. 3 are derived at the output terminals of the Hall element 2 due to the rotating magnetic field of the rotor. The voltages $V_1$ and $V_2$ are amplified by the differential amplifier constituted of the transistors $T_2$ and $T_6$ and then they are converted, as described before, to the currents $I_1'$ and $I_2'$ as shown in FIG. 4. The currents $I_1'$ and $I_2'$ are further divided respectively into the currents $I_1$ and $I_s$, $I_1$ flowing into the base of the transistor $T_{14}$ and $I_s$ flowing through the transistor $T_8$, and into the currents $I_2$ and $I_s$, $I_2$ flowing into the base of the transistor $T_{11}$ and $I_s$ through the transistor $T_{10}$. The currents $I_1$ and $I_2$, flowing into the bases of the transistors $T_{14}$ and $T_{11}$, serve to determine the conduction angle and can be approximated by the expressions given below.

$$I_1 = \frac{2E_D - E_B + \frac{R_2}{2} I_o + e_H \sin \omega t}{R_3} - I_s \quad (1)$$

$$I_2 = \frac{2E_D - E_B + \frac{R_4}{2} I_o - e_H \sin \omega t}{R_5} - I_s \quad (2)$$

, where $E_D$ is the forward voltage drop across the diodes $D_1$ and $D_2$, $E_B$ the forward voltage drop between the base and the emitter of the transistors $T_3$ or $T_7$, $I_o$ the preset current value in the differential amplifier, $I_s$ the constant current for determining the conduction angles, and $e_H \sin \omega t$ the voltages as the amplified versions of the outputs of the Hall element, appearing across the load resistors $R_2$ and $R_4$ of the differential amplifier.

Namely, the currents $I_1$ and $I_2$ flowing into the bases of the transistors $T_{14}$ and $T_{11}$ are changed depending upon the voltage delivered from the Hall element, and converted to the waveforms shown in FIG. 5. If it is assumed that $I_B$ is the base current at which the transistors $T_{11}$ and $T_{14}$ are turned on and that $V_3$ and $V_4$ are the components of the control voltage V divided by the resistors $R_6$ and $R_7$ and by the resistors $R_8$ and $R_9$, as shown in FIG. 2, then the voltages $V_3$ and $V_4$ take the waveforms as shown in FIG. 6 in the region where $I_1$ or $I_2$ is greater or smaller than $I_B$.

Since the transistors $T_{14}$ and $T_{11}$ are both conductive in the region where both $I_1$ and $I_2$ exceed $I_B$, the voltages $V_3$ and $V_4$ varnish. Accordingly, the transistors $T_{16}$ and $T_{13}$ for driving the coils of the stator winding are cut off so that the currents through the coils are interrupted. The transistor $T_{14}(T_{11})$ is cut off during the period T for which $I_1(I_2)$ is smaller than $I_B$.

The counter electromotive forces induced in the coils 5 and 7 of the stator winding, which are proportional to the rotational speed of the motor, are sent through the diodes $D_4$ and $D_3$ to the counter e.m.f. detecting element 20. After the output of the detector 20 has been divided by the circuit including the resistor $R_{20}$, a speed control voltage is generated by the speed control circuit 21. The control voltage is further divided by the resistors $R_6$ and $R_7$ and by the resistors $R_8$ and $R_9$ and the respectively divided voltages $V_3$ and $V_4$ are applied to the collectors of the transistors $T_{11}$ and $T_{14}$. In this case, the transistors $T_{11}$ and $T_{14}$ constitute a multiplying circuit so that when the transistors $T_{11}$ and $T_{14}$ are non-conductive, i.e. in the state 0, the result of multiplication is 0 while when they are conductive, i.e. in the state 1, the result of multiplication is $V_3$ and $V_4$. Therefore, when the transistor $T_{11}$ ($T_{14}$) is cut off, the voltage $V_3$ ($V_4$) is applied through the resistor $R_{12}$ ($R_{13}$) to the base of the transistor $T_{12}$ ($T_{15}$) so that the transistor $T_{13}$ ($T_{16}$) for driving the coil 5 (7) of the stator winding is brought into conduction. The collector-emitter voltage of the transistor $T_{13}$ ($T_{16}$) is so controlled as to cause a desired current to flow through the coil 5 (7) of the stator winding so that the motor may be rotated by the desired current.

If the speed control circuit has only to be so designed as to deliver a speed control voltage V which is low (or high) when the rotational speed of the motor is high (or low), the currents flowing through the transistors $T_{16}$ and $T_{13}$ can be controlled by the voltage V so that the motor may be rotated at a constant speed.

Figure 7:
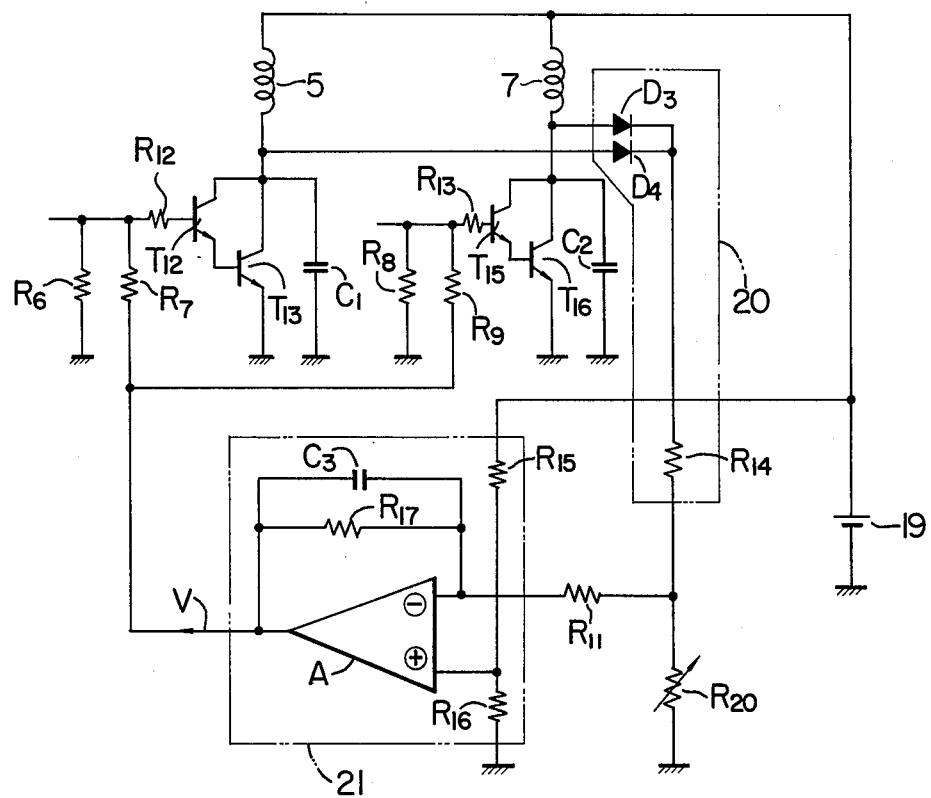
FIG. 7 is an electric circuit as the detail of a portion of the circuit shown in FIG. 2.

FIG. 7 shows in detail examples of the counter e.m.f. detecting circuit 20 and the speed control circuit 21, shown in FIG. 2, and in this figure are shown a differential amplifier A, resistors $R_{14} - R_{17}$ and a capacitor $C_3$.

The resistor $R_{14}$ together with the variable resistor $R_{20}$, serves to divide the voltage supplied through the diodes $D_3$ and $D_4$ while the resistors $R_{15}$ and $R_{16}$ serve to divide the voltage of the DC power source 19 and to apply the divided voltage to the positive input terminal + of the differential amplifier A. The difference amplifier A and the resistor $R_{17}$ and the capacitor $C_3$ constitute an integrator.

As seen in FIG. 7, the counter electromotive forces proportional to the rotational speed are taken out of the coils 5 and 7 of the stator winding through the diodes $D_4$ and $D_3$ and the counter electromotive forces are each divided by the resistor $R_{14}$ and the variable resistor $R_{20}$ and the divided component is applied to the negative input terminal − of the differential amplifier A. On the other hand, the voltage of the power source is divided by the resistors $R_{15}$ and $R_{16}$ and the divided component is applied to the positive input terminal + of the differential amplifier A so as to obtain the speed control voltage V therefrom.

The fluctuation of the rotational speed due to the thermal fluctuation in the Hall elements 2 and 4 for detecting the angular positions, can be compensated and therefore reduced to a considerable extent by means of the diodes $D_1$ and $D_2$, as shown in FIG. 2. Namely, as apparent from $I_1$ and $I_2$ described above and from FIGS. 4 and 5, the AC components in $I_1$ and $I_2$ decrease with the increase in the temperature of the angular position detecting element if the output of the detecting element has a negative temperature coefficient. Correspondingly, however, the forward voltage drops across the diodes $D_1$ and $D_2$ decrease so that the DC components of $I_1$ and $I_2$ also decrease. Thus, with suitable circuit constants, the variation in the output of the angular position detecting element due to the fluctuation of temperature can be cancelled and the conduction angle can be kept fixed. It is also easy to set the conduction angle at any desired value.

Further, even if due to the change in, for example, the ambient temperature the voltage of the power source 19 is changed to change the value of the current supplied from the constant current circuit constituted of the transistors $T_1$, $T_5$, $T_8$ and $T_{10}$, the output of the differential amplifier consisting of the transistors $T_2$ and $T_6$ accordingly changes to cancel the resultant change so that a stable operation can be assured.

Moreover, since the difference current, obtained by the constant current circuit consisting of transistors, is applied directly to the conduction angle determining circuit, the overall circuit can be simplified.

Furthermore, since the operating current for the driving circuit can be made small by choosing the preset current of the constant current circuit to be a small value, the power to be consumed can considerably be decreased. Consequently, a driving circuit well adapted for integration, having a high reliability can be obtained according to this invention.

We claim:

1. A driving circuit for a brushless DC motor consisting mainly of a rotor of permanent magnet having a pair of N and S poles, a stator winding having a plurality of coils and at least one detecting element for detecting the angular position of said rotor; said driving circuit comprising:

a first means for amplifying the AC voltage derived from said detecting element and for converting the amplified voltage to an AC current;

a second means for supplying a predetermined constant current;

a third means for obtaining a current as the difference of the current from said first means and said constant current from said second means;

a fourth means for generating a control signal corresponding to a desired speed;

a fifth means for determining the conduction angle in accordance with the difference current derived from said third means and said control signal derived from said fourth means; and a sixth means for controlling the currents flowing through said coils of said stator winding in accordance with said conduction angle determined by said fifth means.

2. A driving circuit as claimed in claim 1, wherein said detecting element is a Hall element.

3. A driving circuit as claimed in claim 1, wherein said first means includes a differential amplifier for amplifying the voltage between the terminal of said detecting element.

4. A driving circuit as claimed in claim 1, wherein said third means is a constant voltage circuit constituted of transistors.

5. A driving circuit as claimed in claim 1, wherein said fourth means includes detecting means for detecting the counter electromotive forces induced in said coils of said stator winding and mans for generating control signals in accordance with the outputs of said detecting means.

6. A driving circuit as claimed in claim 1, wherein said sixth means includes a switching element which is turned on and off in accordance with said conduction angle.

7. A driving circuit as claimed in claim 1, wherein said fifth means is constituted of a switching element which is turned on and off in response to said difference current derived from said third means and an output means for delivering a voltage in accordance with said control signal in one of the on- and off-states of said switching element.

8. A driving circuit as claimed in claim 1, wherein said first means includes a compensating element for compensating the fluctuation of the output of said detecting element due to the variation in temperature.

9. A driving circuit as claimed in claim 3, wherein said differential amplifier comprises a first and a second transistors having their input electrodes connected respectively with the output terminals of said detecting element, a first constant current circuit connected in common with the first output electrodes of said first and second transistors, a first and second transistors, a first and a second load resistors having their one ends connected respectively with the second output electrodes of said first and second transistors and a temperature compensating element connected in common with the other ends of said first and second load resistors.

10. A driving circuit as claimed in claim 9, wherein said temperature compensating element comprises at least one diode.

11. A driving circuit as claimed in claim 9, wherein said first means includes a first and a second transistor circuits for respectively converting the voltages derived from said second output electrodes of said first and second transistors to the corresponding currents.

12. A driving circuit as claimed in claim 1, wherein said third means includes a second and a third constant current circuits each consisting of transistors connected with said first and second transistor circuits.

13. A driving circuit as claimed in claim 5, wherein said control signal generating means includes an integrator for generating an output in accordance with the output of said detecting means.

* * * * *